(12) United States Patent
Burroughs et al.

(10) Patent No.: US 6,398,540 B1
(45) Date of Patent: Jun. 4, 2002

(54) FOOD MOLD PLATE AND ASSEMBLY

(75) Inventors: Thomas B. Burroughs, Cincinnati; Kristopher F. Corbin, Hamilton, both of OH (US)

(73) Assignee: Pierre Foods, Inc., Cincinnati, OH (US)

( * ) Notice: Subject to any disclaimer, the term of this patent is extended or adjusted under 35 U.S.C. 154(b) by 0 days.

(21) Appl. No.: 09/611,271

(22) Filed: Jul. 6, 2000

(51) Int. Cl.[7] ................................................ A22C 7/00
(52) U.S. Cl. .................... 425/447; 426/513; 425/570; 425/575; 425/572
(58) Field of Search ...................... 426/513; 425/447, 425/470, 575, 574, 572, 562, 577

(56) References Cited

U.S. PATENT DOCUMENTS

| | | | |
|---|---|---|---|
| 3,909,880 A | 10/1975 | Holly | 425/556 |
| 4,054,967 A | 10/1977 | Sandberg et al. | 426/513 |
| 4,097,961 A | 7/1978 | Richards | 425/572 |
| RE30,096 E | 9/1979 | Richards | 425/167 |
| 4,182,003 A | 1/1980 | Lamartino et al. | 425/556 |
| 4,272,864 A | 6/1981 | Holly | 426/513 |
| 4,356,595 A | 11/1982 | Sandberg et al. | 426/513 |
| 4,372,008 A | 2/1983 | Sandberg | 426/512 |
| 4,418,446 A * | 12/1983 | Sandberg et al. | 426/513 |
| 4,497,844 A | 2/1985 | Hice et al. | 426/513 |
| 4,541,143 A | 9/1985 | Holly | 426/513 |
| 4,608,731 A | 9/1986 | Holly | 426/513 |
| 4,697,308 A | 10/1987 | Sandberg | 425/562 |
| 4,821,376 A | 4/1989 | Sandberg | 425/562 |
| 4,872,241 A | 10/1989 | Lindee | 426/513 |
| 4,928,591 A | 5/1990 | Lindee | 99/485 |
| 4,996,743 A | 3/1991 | Janssen | 425/579 |
| 5,022,888 A | 6/1991 | Lindee | 425/556 |
| 5,030,164 A | 7/1991 | Wagner | 426/513 |
| 5,149,298 A | 9/1992 | Lindee | 426/513 |

* cited by examiner

Primary Examiner—Robert Davis
Assistant Examiner—Thu Khanh T. Nguyen
(74) Attorney, Agent, or Firm—McGuireWoods LLP; Paul E. McGowan, Esq.

(57) ABSTRACT

A mold fill plate and mold fill assembly are characterized by a mold fill plate and mold shuttle plate each being a planar body defining a longitudinal extent and a transverse extent and each having a plurality of elongate slots arranged so that when the slots are in registry a flowable food product can pass through the slots into a mold chamber, the slots further being arranged along at least a portion of their longitudinal extent with each slot extending across at least a portion of the transverse extent.

6 Claims, 7 Drawing Sheets

FOOD MOLD PLATE AND ASSEMBLY

BACKGROUND OF THE INVENTION

The present invention is directed to methods and apparatus for forming molded food products and, more particularly, to a method and an assembly for forming a molded food product from a fibrous material resulting in enhanced natural texture of the molded food product. Various types of food patties are molded in high-volume automated molding machines. These can include hamburgers, "ribs," fish cakes, chicken patties, pork and others characterized by fiber in the product. An example of such a molding machine and the molding process is disclosed in the Sandberg et al., U.S. Pat. No. 4,372,008.

Figure 1:
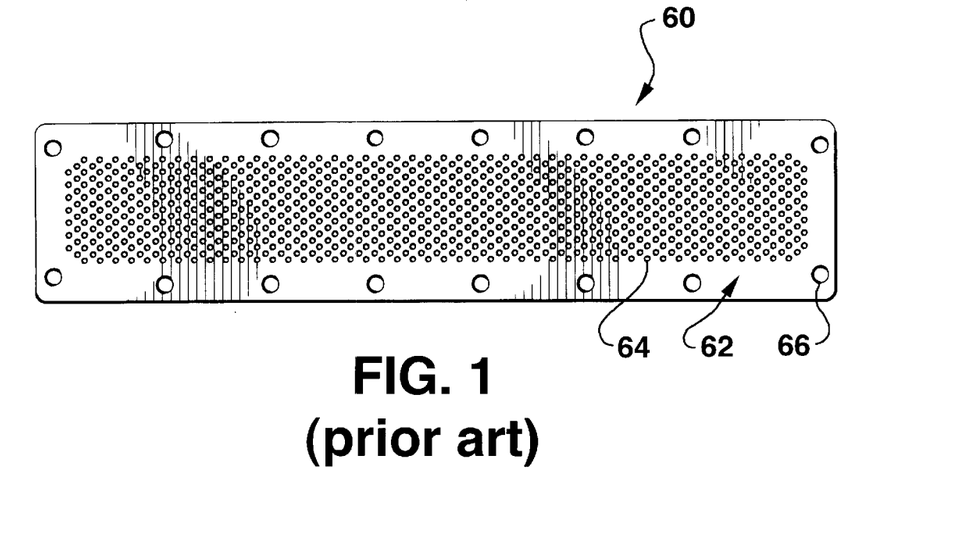
FIG. 1 is a plan view of a prior art mold fill plate.
Figure 2:
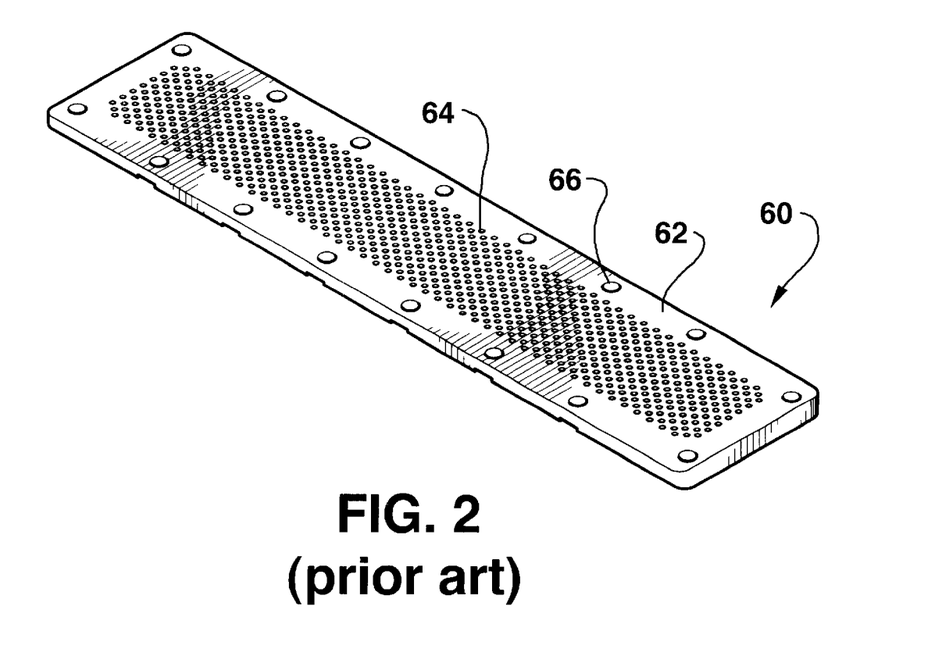
FIG. 2 is a perspective view of the mold fill plate illustrated in FIG. 1.

The Sandberg patent identifies one of the problems inherent in molding food products. While the molding machines can make products consistent in size, weight and volume, some have difficulty in producing a realistic food texture. The Sandberg patent addresses that problem by providing a food mold fill plate as illustrated in FIGS. 1 and 2 herein, and an associated fill assembly. As seen in FIGS. 1 and 2, a mold fill plate 60 formed as a generally rectangular planar metallic body 62 having a plurality of openings 64 formed in rows and columns through the surface thereof Mounting openings 66 are provided around the edge of the body 62.

As will be explained in greater detail hereinafter, the food molding process involves forcing a flowable food product, such as ground meat, through a mold fill plate such as that illustrated in FIGS. 1 and 2, or one having an alternate configuration. The food product flows through the openings 64 in the mold fill plate. According to the prior mold plate illustrated in FIGS. 1 and 2, the food product flows into generally vertical plugs that expand radially outwardly to contact one another or the walls of the mold chamber. This produces a series of vertically aligned meat fibers that are loosely bound at the plug boundaries. This provides an initial step toward a more natural texture, especially with hamburger or ground pork. A more detailed description of the food molding process will follow hereinafter.

Even though the natural texture of a hamburger patty is enhanced by the use of the prior mold plate, other forms of food products do not achieve such a benefit with the prior configuration. For example, ribbed or rib patties are a popular item and are formed to resemble a natural meat product with defined ribs. The current state of the art does not allow the ribbed meat products to assume a more natural texture. Therefore, the need exists to provide a meat molding apparatus that will provide a ribbed food product with a natural texture.

SUMMARY OF THE INVENTION

It is accordingly an object of the present invention to provide a food mold assembly and method that will provide a more naturally textured, ribbed food product.

It is another object of the present invention to provide such a method and apparatus that will provide a ribbed product that tends to break at naturally appearing rib sections that will thus enhance the desirability of such a molded meat product.

To those ends, the present invention provides a mold plate, a mold plate assembly and a method for molding a food product to provide a food product that aligns fibrous food material to achieve a more natural texture than has been previously available. Accordingly, a mold plate for a food product molding machine is provided wherein a flowable food product containing fibrous material is injected through the mold fill plate into a mold chamber, the mold chamber being formed according to a predetermined food product configuration, and the flowable mixture thereby assuming the shape of the food product mold chamber and having a texture characterized by the fibrous material with the mold fill plate including a planar body defining a longitudinal extent and a transverse extent, the body being formed by the plurality of elongate slots arranged along at least a portion of the longitudinal extent. Each slot of the plurality of slots extending across at least a portion of the transverse extent.

The elongate slots are preferably formed in a generally parallel orientation and also preferably formed with graduated lengths.

The present invention also provides a mold fill assembly for a food product molding machine characterized above where the mold fill assembly includes a mold fill plate including a planar body defining a longitudinal extent and a transverse extent, the mold fill plate being formed by a plurality of elongate slots arranged along at least a portion of the longitudinal extent, each slot of the plurality of slots extending across at least a portion of the transverse extent. A shuttle plate is provided that is disposed adjacent the mold fill plate and slidably mounted thereto. The shuttle plate includes a plurality of elongate cavities corresponding to the slots formed in the mold fill plate and moveable in and out of registry therewith when the shuttle plate slides relative to the mold fill plate, whereby the flowable food product containing fibrous material is directed through the cavities and the slots and into the mold chamber with fibers within the fibrous mixture becoming generally aligned along the slots and cavities to provide a food product with enhanced natural texture.

It is preferred that the elongate slots formed in the mold fill plate are arranged in a generally parallel orientation and that the elongate slots in the mold fill plate are formed with graduated lengths.

The present invention may also be characterized as a mold fill assembly for a meat molding machine for forming a ribbed meat product wherein a flowable meat product containing fibrous material is injected through the mold fill assembly into a mold chamber, the mold chamber being formed with a ribbed meat product configuration, the flowable mixture thereby assuming the shape of the ribbed meat product and having a texture characterized by the fibrous material. The mold fill assembly includes a mold fill plate having a planar body defining a longitudinal extent and a transverse extent, the mold fill plate being formed in the plurality of elongate slots arrange along a portion of the longitudinal extent with each slot of the plurality of slots extending across a portion of the transverse extent. A shuttle plate is provided and disposed adjacent the mold fill plate and slidably mounted thereto. The shuttle plate includes a plurality of elongate cavities corresponding to the slots formed in the mold fill plate and moveable in and out of registry therewith when the shuttle plate slides relative to the mold plate, whereby the flowable meat product containing fibrous material is directed through the cavities and slots into the mold chamber with fibers within the fibrous mixture becoming generally vertically aligned along the slots and cavities to provide a ribbed meat product with enhanced natural texture including the tendency to separate along naturally appearing rib portions when urged. Preferably, the elongate slots formed in the mold fill plate are arranged in a generally parallel orientation. Further, the elongate slots formed in the mold fill plate are preferably formed with graduated lengths.

The present invention also provides a method for forming a rib meat product. The method for forming a ribbed meat product uses a meat molding machine wherein a flowable meat product containing fibrous material is injected into a mold chamber, the mold chamber being formed with a ribbed meat product configuration whereby the flowable mixture assumes the shape of the mold chamber and has a texture characterized by the fibrous material.

The method includes the steps of providing a meat molding machine having a mold chamber and characterized by a meat mold assembly including a mold fill plate having a planar body defining a meat molding machine having a mold chamber and characterized by a meat mold assembly including a mold fill plate having a planar body defining a longitudinal extent and a transverse extent, the mold fill plate being formed with a plurality of elongate slots arranged along a portion of the longitudinal extent with each slot of the plurality of slots extending across a portion of the transverse extent. A shuttle plate is disposed adjacent the mold fill plate and slidably mounted thereto with the shuttle plate including a plurality of elongate cavities corresponding to the slots formed in the mold fill plate and moveable in and out of a registry therewith when the shuttle plate slides relative to the mold fill plate.

The method further includes the steps of providing a supply of flowable meat product and injecting the flowable meat product through the mold fill assembly and into the mold chamber, whereby the flowable meat product containing fibrous material is directed through the cavities in the slots into the mold chamber with fibers within the fibrous mixture becoming generally vertically aligned along the slots and cavities. The present inventive method further includes the step of moving the shuttle plate relative to the mold fill plate to move the cavities out of registry with the slots to cut any meat product including fibrous material in the mold chamber away from the meat product supply, wherein the method thereby provides a ribbed meat product with enhanced natural texture, including the tendency to separate along naturally appearing rib portions when urged.

DESCRIPTION OF THE PREFERRED EMBODIMENT

Figure 3:
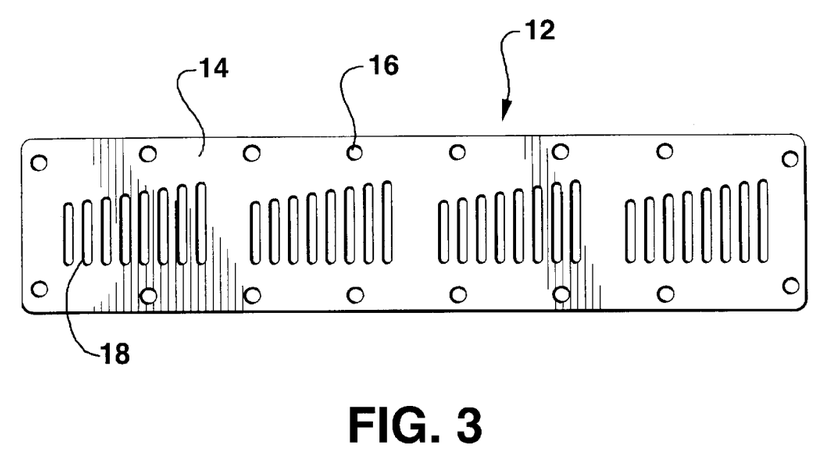
FIG. 3 is a plan view of a mold fill plate according to present invention.
Figure 4:
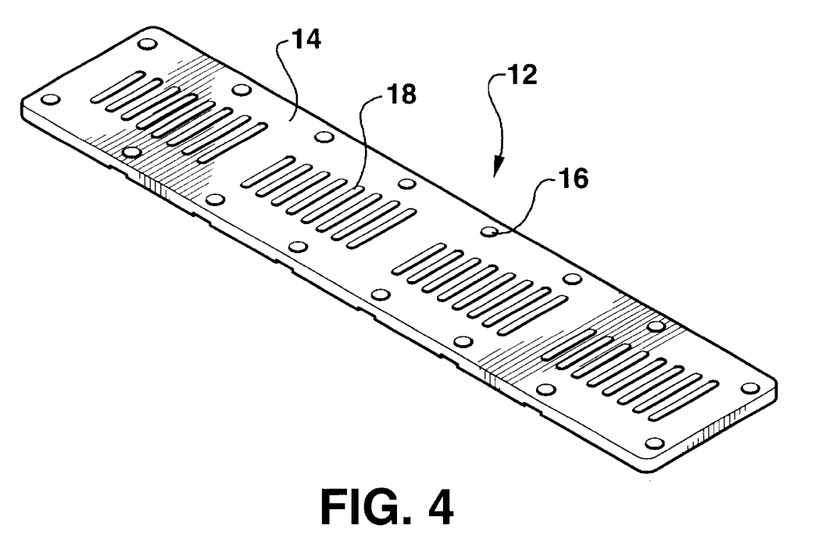
FIG. 4 is a perspective view of the mold fill plate illustrated in FIG. 3.
Figure 10:
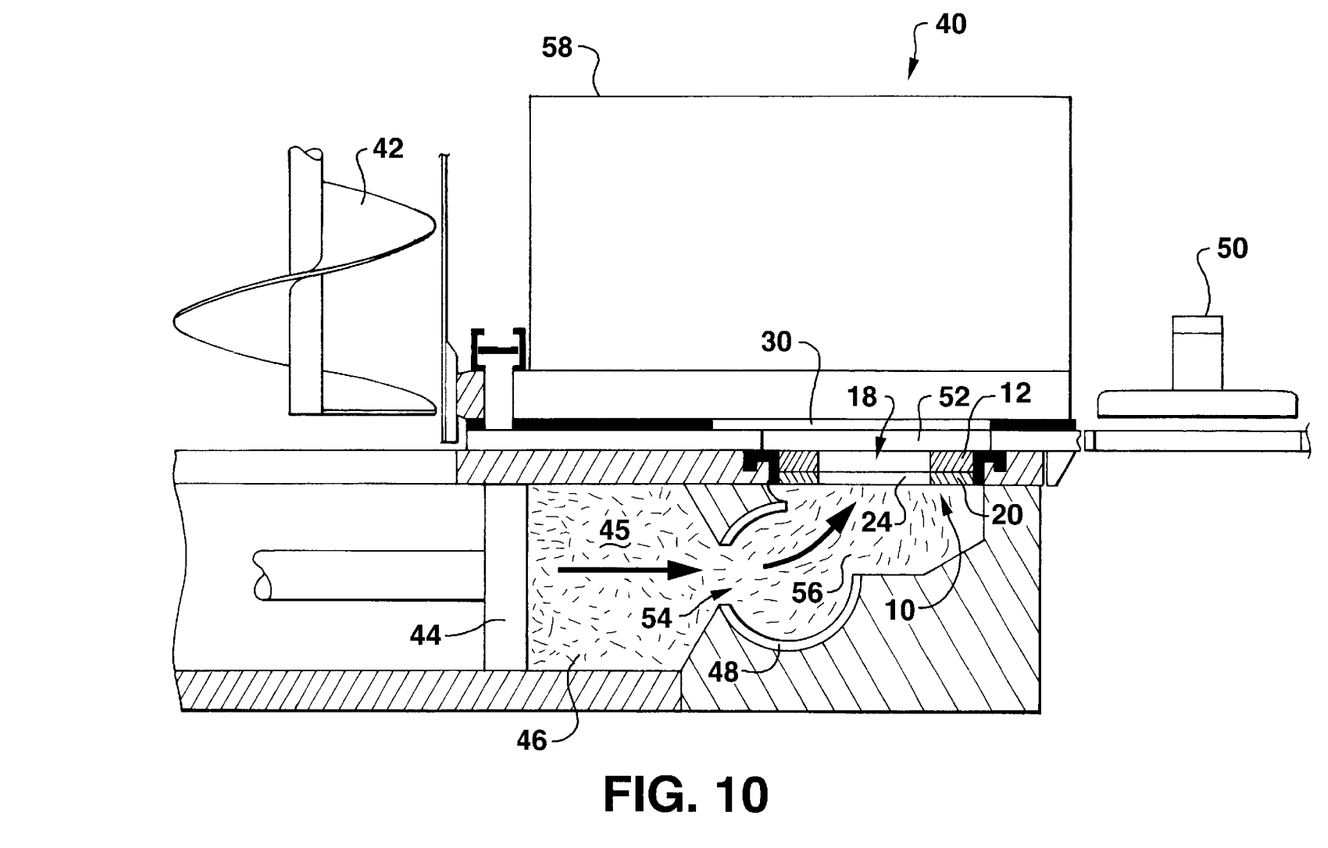
FIG. 10 is a diagrammatic view of a food product molding machine incorporating the mold fill assembly of the present invention.

FIGS. 3 and 4 illustrate a mold fill plate in accordance with the present invention for use in a high-volume food patty molding machine as illustrated generally in FIG. 10. Such a machine is described in detail in Richards, U.S. Pat. No. 3,887,964, and Sandberg et al., U.S. Pat. No. 4,372,008, and has been marketed as the Formax 26 machine by Formax, Inc. of Mokena, Ill. Such a machine is a floor standing machine containing hydraulic and electric actuating systems and a control system. It should be noted that while the present invention is described in relation to the Formax 26 machine, the present invention has application and utility with any meat molding machine. A molding machine is illustrated in relevant part at 40 in FIG. 10.

Generally, and with continued reference to FIG. 10, a flowable food product such as meat containing fibrous material is illustrated at 46 and is obtained from a supply hopper (not shown) of the flowable meat product. A feed screw 42 is configured as an auger and drives the flowable product into a meat delivery chamber 46. The meat delivery chamber 46 includes a plunger 44 mounted therein to force the meat horizontally toward the mold chamber. Such a meat molding machine 40 can mold multiple patties simultaneously and accordingly, includes a tube valve rotatably mounted within the meat delivery chamber 46. The tube valve 48 includes generally tubular walls and a tube inlet 54 and a tube outlet 56. The valve may be rotated for alignment of the selected meat delivery path. The valve inlet 54 and the outlet 56 align with similar inlets and outlets in the meat delivery chamber 46 to allow meat to flow through the tube valve 48 and toward the mold fill assembly 10.

The mold fill assembly 10 is mounted across an opening existing between the mold chamber 52 and the meat delivery chamber 46. The mold plate 30 is positioned within the mold chamber 52 to define the shape of the product to be formed by the mold process. A mold cover 58 covers the mold mechanism. Once the food product is formed, the mold is shifted outwardly from the mold chamber 52 and a knock-out cup 50 is provided for selective removal of food product from the mold. The foregoing describes the general operation of the food molding machine 40. More detailed operation of such a machine is described in the aforesaid patents and it will be apparent to those skilled in the art of the use and advantages of the present invention when operating a food molding machine in accordance with the present invention.

Turning now to FIG. 3, a mold fill plate is illustrated generally at 12 and includes a generally planar metallic body 14 having a series of mounting openings formed around the edges 16. The mounting openings allow firm and solid mounting of the mold fill plate 12 within the mold fill assembly. The generally rectangular mold fill plate 12 defines a transverse extent and a longitudinal extent along its short sides and long sides respectively. A plurality of elongate slots 18 are formed in a generally parallel arrangement and extend through the body 14 of the mold fill plate 12. The slots 18 are formed as a group with graduated lengths, i.e. with one slot in a set having a different length than the next slot, with the length increasing or decreasing depending on perspective. As seen in FIGS. 3 and 4, four sets of eight slots are provided to form four separate food patties. It should also be noted that the slots need not be of graduated length and that the configuration and length of the slots is dictated by the desired configuration of the final food product.

Figure 5:
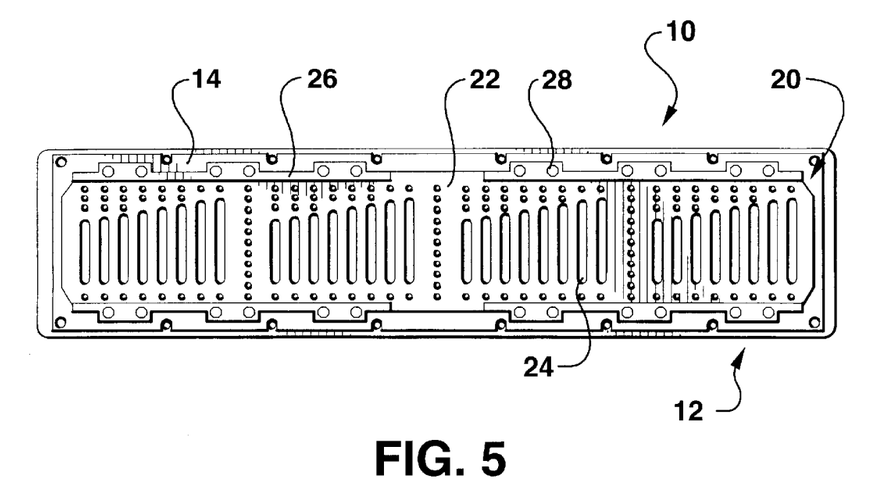
FIG. 5 is a plan view of a mold fill assembly according to the present invention.
Figure 6:
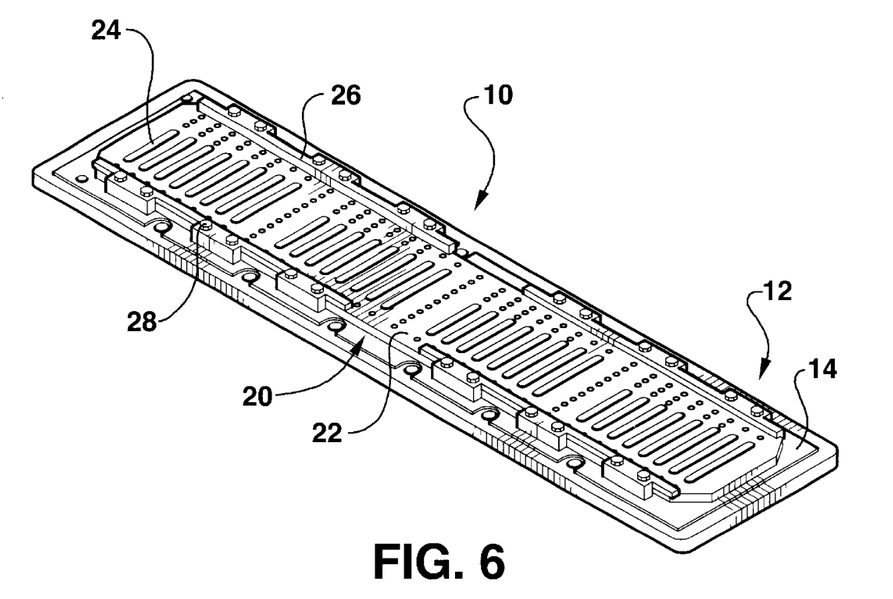
FIG. 6 is a perspective view of the mold fill assembly illustrated in FIG. 5.

Turning now to FIGS. 5 and 6, a mold fill assembly is illustrated and includes the mold fill plate 12 having a shuttle plate 20 attached thereto. The shuttle plate 20 includes a generally elongate body 22 having a transverse extent and a longitudinal extent along the short and long sides respectively. A plurality of cavities 24 are formed as elongate openings that correspond with the slots 18 in the fill plate 12. The shuttle plate 20 is slidably mounted to the fill plate 12 using a series of track bars 26 that are attached to the mold fill plate 12 using bolts 28. This arrangement allows the shuttle plate 20 to move under urging relative to the mold fill plate 12. As seen in FIG. 10, this assembly is mounted to the mold machine between the mold cavity 52 and the meat delivery chamber 46.

Figure 7:
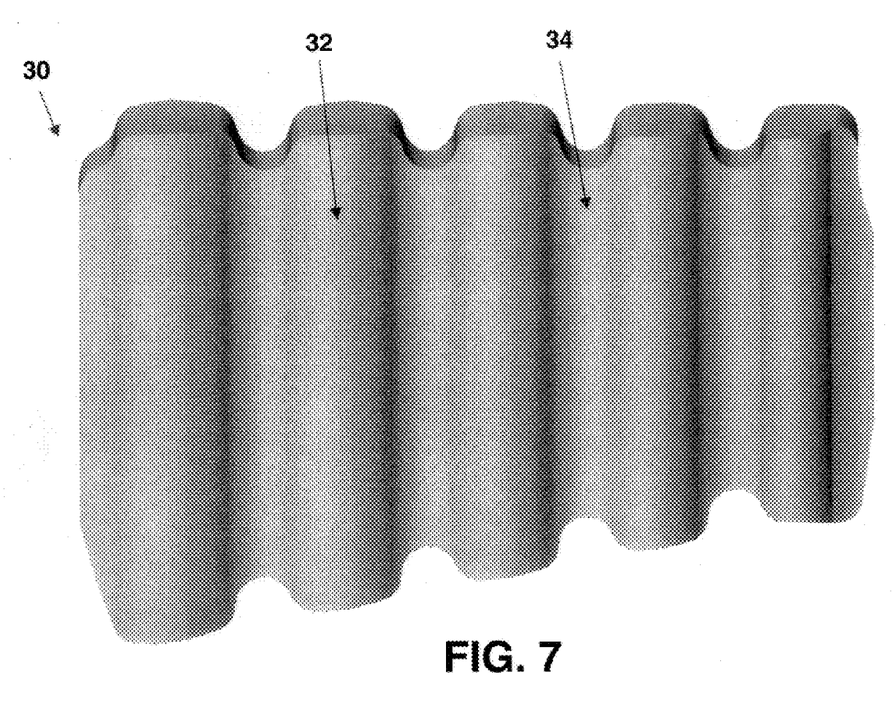
FIG. 7 is a diagrammatic view of a mold plate as used in accordance with the present invention.
Figure 8:
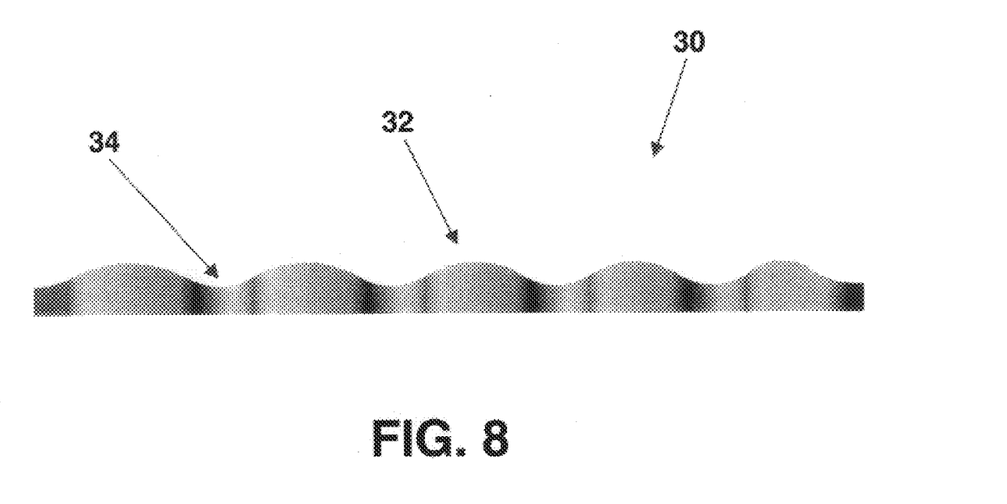
FIG. 8 is a side view of the mold plate illustrated in FIG. 7.
Figure 9:
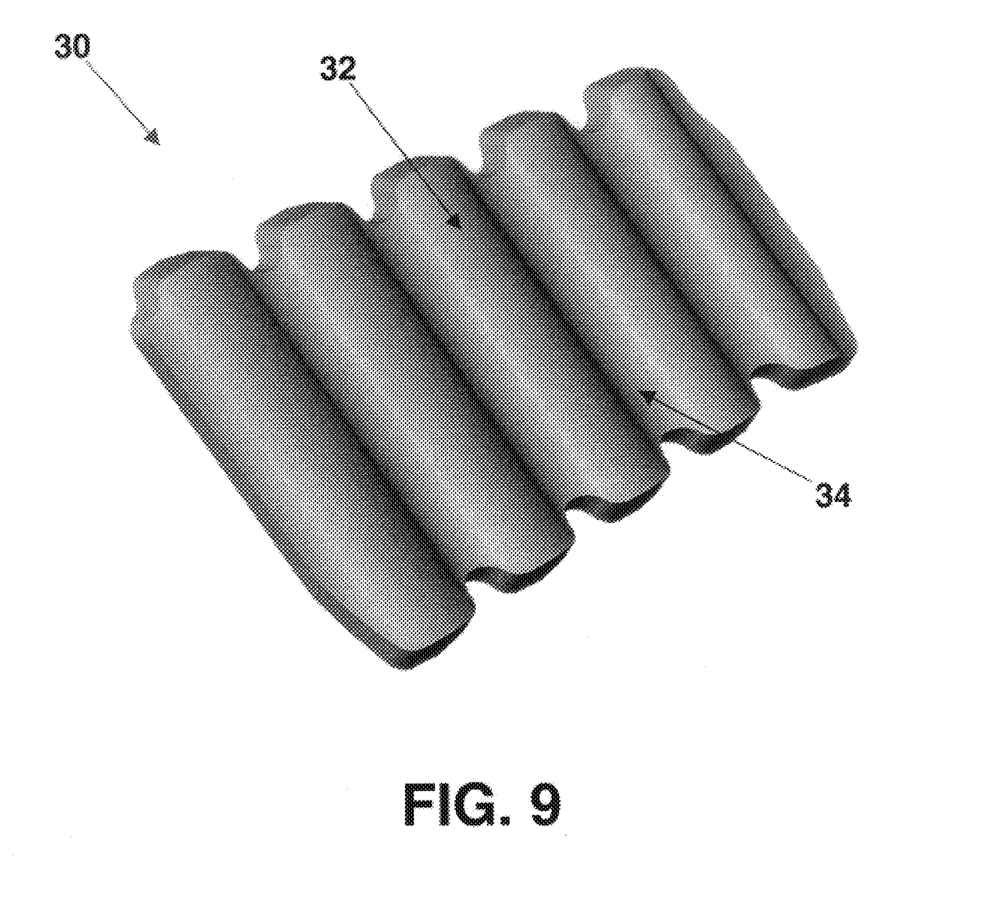
FIG. 9 is a perspective view of the mold plate illustrated in FIG. 7.

In order to form a ribbed meat product, a mold chamber 52 is defined by a mold plate 30 as seen in FIGS. 7, 8 and 9. The mold plate 30 provides the general configuration of the resultant food product when it is filled with the meat product. As seen in FIG. 8, the surface texture of the ribbed meat product mold plate 30 includes a series of ridges 32 and valleys 34 for defining naturally appearing ribs in the meat product. As seen in FIG. 7, projections are formed along the side of the mold plate 30 to also give the appearance of natural ribs.

In operation, the mold plate 30 is mounted in the molding machine 40 to define the mold chamber 52 as seen in FIG. 10. The mold fill assembly 10 is mounted to the framework of the mold machine 40 in a known manner and as has been previously described. A flowable meat product 45 is fed from a supply (not shown) using the feed screw 42 to drive the meat product 45 into the meat delivery chamber 46. The tubular valve 48 is rotated to align the inlet 54 and outlet 56 with respective inlets and outlets in the meat delivery chamber. The plunger 44 is then used to force the meat product 45 through the tube valve 48 and upwardly through the openings defined by the cavities 24 and the slots 18 in the shuttle plate 20 and the mold fill plate 12, respectively, resulting in the food product filling the mold chamber 52. During this operations, the fibers within the fibrous meat product become generally vertically aligned and intertwined along the length of the slots and cavities and are loosely connected intermediate the slots and cavities. When the mold chamber 52 is filled, the hydraulic controls (not shown) are used to move the shuttle plate 20 relative to the mold fill plate 12 to bring the slots 18 and cavities 24 out of registry and allow the walls defining the cavities 24 in the shuttle plate 20 to cut the fibers and thereby define the final form of the ribbed meat product. The ribbed meat product is then moved out of the mold chamber 52 using hydraulic or electric actuators (not shown) and removed therefrom using the knock out cup 50 in a known manner.

The resultant ribbed meat product includes a series of transversely extending naturally appearing rib elements that, due to the fiber alignment provided by the present invention, will break naturally at the rib junctions when urged.

By the above, the present invention provides an effective device that will produce ribbed meat products with an enhanced natural texture.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof period.

We claim:

1. A mold fill plate for a food product molding machine wherein a flowable food product containing fibrous material is injected through said mold fill plate into a mold chamber, the mold chamber being formed with a predetermined food product configuration, the flowable mixture thereby assuming the shape of the food product mold chamber and having a texture characterized by said fibrous material, said mold fill plate comprising:

a planar body defining a longitudinal extent and a transverse extent, said body being formed with a plurality of elongate slots, formed with graduated lengths, arranged along at least a portion of said longitudinal extent, each slot of said plurality of slots extending across at least a portion of said transverse extent.

2. A mold fill plate according to claim 1 wherein said elongate slots are arranged in a generally parallel orientation. formed with graduated lengths.

3. A mold fill assembly for a food product molding machine wherein a flowable food product containing fibrous material is injected through said mold fill assembly into a mold chamber, the mold chamber being formed with a predetermined food product configuration, the flowable mixture thereby assuming the shape of the food product mold and having a texture characterized by said fibrous material, said mold fill assembly comprising:

a mold fill plate including a planar body defining a longitudinal extent and a transverse extent, said mold fill plate being formed with a plurality of elongate slots arranged along at least a portion of said longitudinal extent, each slot of said plurality of slots extending across at least a portion of said transverse extent; and a shuttle plate disposed adjacent said mold fill plate and slidably mounted thereto, said shuttle plate including a plurality of elongate cavities corresponding to said slots formed in said mold fill plate and movable in and out of registry therewith when said shuttle plate slides relative to said mold fill plate, whereby the flowable food product containing fibrous material is directed through said cavities and said slots into said mold chamber with fibers within said fibrous mixture becoming generally vertically aligned along said slots and cavities to provide a food product with enhanced natural texture.

4. A mold fill assembly according to claim 3 wherein said elongate slots formed in said mold fill plate are arranged in a generally parallel orientation.

5. A mold fill assembly according to claim 3 wherein said elongate slots formed in said mold fill plate are formed with graduated lengths.

6. A mold fill assembly for a meat molding machine wherein a flowable meat product containing fibrous material is injected through said mold fill assembly into a mold chamber, the mold chamber being formed with a ribbed meat product configuration, the flowable meat product thereby assuming the shape of the ribbed meat product mold and having a texture characterized by said fibrous material, said mold fill assembly comprising:

a mold fill plate including a planar body defining a longitudinal extent and a transverse extent, said mold fill plate being formed with a plurality of elongate slots, form with graduated lengths, arranged along a portion of said longitudinal extent, in a generally parallel orientation each slot of said plurality of slots extending across a portion of said transverse extent; and a shuttle plate disposed adjacent said mold fill plate and slidably mounted thereto, said shuttle plate including a plurality of elongate cavities corresponding to said slots formed in said mold fill plate and movable in and out of registry therewith when said shuttle plate slides relative to said mold fill plate, whereby the flowable meat product containing fibrous material is directed through said cavities and said slots into said mold chamber with fibers within said fibrous mixture becoming generally vertically aligned along said slots and cavities to provide a ribbed meat product with enhanced natural texture, including the tendency to separate along naturally appearing rib portions when urged.

\* \* \* \* \*